United States Patent
Harada et al.

(10) Patent No.: US 9,422,437 B2
(45) Date of Patent: Aug. 23, 2016

(54) COPOLYMER, AQUEOUS INK, AND INK CARTRIDGE

(71) Applicants: Shigeyuki Harada, Shizuoka (JP); Keita Katoh, Kanagawa (JP); Masayuki Fukuoka, Shizuoka (JP); Kazukiyo Nagai, Shizuoka (JP); Yuusuke Koizuka, Shizuoka (JP)

(72) Inventors: Shigeyuki Harada, Shizuoka (JP); Keita Katoh, Kanagawa (JP); Masayuki Fukuoka, Shizuoka (JP); Kazukiyo Nagai, Shizuoka (JP); Yuusuke Koizuka, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/793,981

(22) Filed: Jul. 8, 2015

(65) Prior Publication Data

US 2016/0032037 A1    Feb. 4, 2016

(30) Foreign Application Priority Data

Jul. 31, 2014   (JP) .................................. 2014-156113

(51) Int. Cl.
| | |
|---|---|
| *C09D 11/107* | (2014.01) |
| *C08F 220/06* | (2006.01) |
| *C09D 4/00* | (2006.01) |
| *C09D 133/02* | (2006.01) |
| *C08K 3/04* | (2006.01) |

(52) U.S. Cl.
CPC ........... *C09D 11/107* (2013.01); *C08F 220/06* (2013.01); *C09D 4/00* (2013.01); *C09D 133/02* (2013.01); *C08K 3/04* (2013.01); *C08K 2003/045* (2013.01)

(58) Field of Classification Search
CPC .. C09D 11/0017; C09D 4/00; C09D 133/02; C08K 3/04; C08K 2003/045; C08F 220/06
See application file for complete search history.

(56) References Cited

U.S. PATENT DOCUMENTS

| | | | | |
|---|---|---|---|---|
| 6,652,634 | B1* | 11/2003 | Akers, Jr. ............ | C09D 11/326 106/31.13 |
| 2007/0043144 | A1* | 2/2007 | House .................. | C09D 11/322 523/160 |
| 2009/0018245 | A1* | 1/2009 | Idemura ................ | C09D 11/326 524/357 |
| 2014/0072779 | A1 | 3/2014 | Matsuyama et al. | |
| 2014/0092180 | A1 | 4/2014 | Matsuyama et al. | |
| 2014/0120331 | A1 | 5/2014 | Koizuka et al. | |
| 2014/0141209 | A1 | 5/2014 | Koizuka et al. | |
| 2014/0198160 | A1 | 7/2014 | Harada et al. | |
| 2014/0199530 | A1 | 7/2014 | Katoh et al. | |
| 2014/0242352 | A1 | 8/2014 | Naruse et al. | |
| 2015/0056425 | A1 | 2/2015 | Nagai et al. | |
| 2015/0064418 | A1 | 3/2015 | Matsuyama et al. | |
| 2015/0064425 | A1 | 3/2015 | Matsuyama et al. | |
| 2015/0109382 | A1 | 4/2015 | Naruse et al. | |
| 2015/0116421 | A1 | 4/2015 | Nonogaki et al. | |
| 2016/0017075 | A1* | 1/2016 | Harada ................ | C09D 11/107 347/86 |

FOREIGN PATENT DOCUMENTS

| | | |
|---|---|---|
| JP | 3-160068 | 7/1991 |
| JP | 2005-298802 | 10/2005 |
| JP | 2006-188624 | 7/2006 |
| JP | 2008-126600 | 6/2008 |
| JP | 2008-536963 | 9/2008 |
| JP | 2009-513802 | 4/2009 |
| JP | 2011-105866 | 6/2011 |
| JP | 2012-036287 | 2/2012 |
| JP | 2012-051357 | 3/2012 |
| JP | 2012-052027 | 3/2012 |
| WO | WO2006/099551 A2 | 9/2006 |
| WO | WO2007/053563 A2 | 5/2007 |

OTHER PUBLICATIONS

U.S. Appl. No. 14/800,064, filed Jul. 15, 2015, Harada, et al.
U.S. Appl. No. 14/800,064, filed Jul. 15, 2015 Inventor: Harada, et al.

* cited by examiner

*Primary Examiner* — Alexander Kollias
(74) *Attorney, Agent, or Firm* — Oblon, McClelland, Maier & Neustadt, L.L.P.

(57) ABSTRACT

A copolymer contains a structure unit represented by Chemical formula 1 and a structure unit represented by Chemical formula 2,

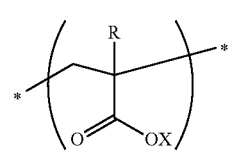

Chemical formula 1

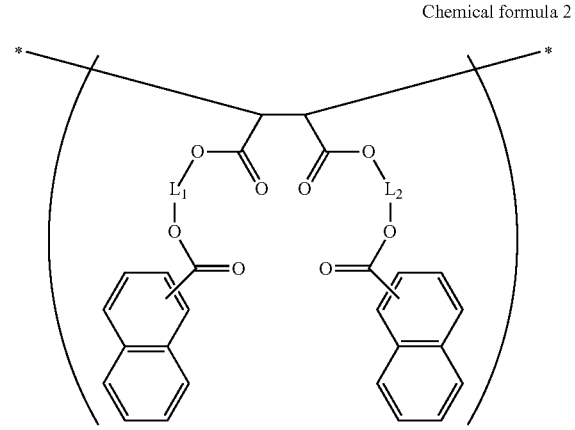

Chemical formula 2 where R represents a hydrogen atom or a methyl group, X represents a hydrogen atom or a cation, L1 and L2 each, independently represent alkylene groups having 2 to 18 carbon atoms.

7 Claims, 2 Drawing Sheets

COPOLYMER, AQUEOUS INK, AND INK CARTRIDGE

CROSS-REFERENCE TO RELATED APPLICATIONS

This patent application is based on and claims priority pursuant to 35 U.S.C. §119(a) to Japanese Patent Application No. 2014-156113, filed on Jul. 31, 2014 in the Japan Patent Office, the entire disclosure of which is hereby incorporated by reference herein.

BACKGROUND

1. Technical Field

The present invention relates to a copolymer, an aqueous ink containing the copolymer, and an ink cartridge.

2. Background Art

Inkjet recording methods are advantageous in comparison with other recording methods in that since the process is simple, full colorization is easy and high definition images can be obtained by a device having a simple configuration. For this reason, the inkjet recording is widely diffusing from home use to office use, commercial printing, and industrial printing. In such an inkjet recording, aqueous ink compositions using water soluble dye as coloring materials are mainly used. However, its water resistance and light resistance are inferior so that the development of a pigment ink using a water insoluble pigment is in advance in place of water soluble dye.

For inkjet ink printing for office use, recording media, typically plain paper, are used and high image density is demanded. In general, when images are printed on plain paper using a pigment ink, the pigment ink does not stay on the surface of the paper but permeates into the paper, so that the pigment density on the surface decreases and consequently the image density lowers. As the pigment concentration in the ink increases, the image density increases. However, the ink becomes viscous, thereby degrading discharging stability.

Moreover, water contained in the pigment ink swells the surface of plain paper immediately after the ink droplets land on the paper. As a result, the extension percentage differs between the top surface and the bottom surface of the paper, thereby causing the paper to curl. This kind of phenomenon does not create a problem at low speed printing since curling is canceled as drying proceeds. However, as the printing speed increases, recording media are transferred before curling is canceled after printing, which naturally leads to occurrence of paper jam. To prevent this paper jam, it is suitable to add a permeating agent to a pigment ink to promote water to permeate into paper. However, ink becomes hydrophobic by the agent, which makes it difficult to secure storage stability of the ink. Also, the pigment ink more easily permeates into a recording medium, thereby furthermore decreasing the image density.

SUMMARY

The present invention provides an improved copolymer which contains a structure unit represented by Chemical formula 1; and a structure unit represented by Chemical formula 2,

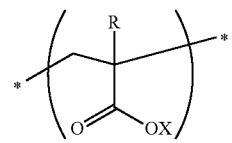

Chemical formula 1

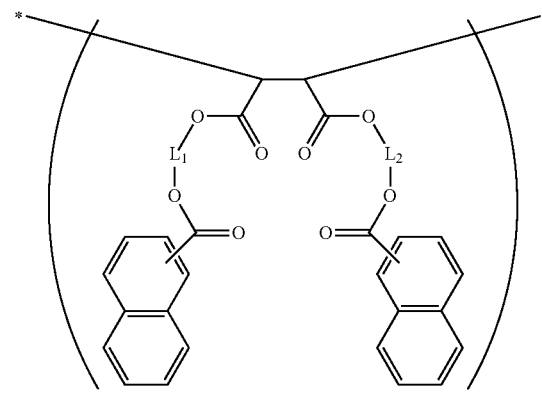

Chemical formula 2 where R represents a hydrogen atom or a methyl group, X represents a hydrogen atom or a cation, L1 and L2 each, independently represent alkylene groups having 2 to 18 carbon atoms.

BRIEF DESCRIPTION OF THE SEVERAL VIEWS OF THE DRAWINGS

Various other objects, features and attendant advantages of the present invention will be more fully appreciated as the same become better understood from the detailed description when considered in connection with the accompanying drawings, in which like reference characters designate like corresponding parts throughout and wherein.

DETAILED DESCRIPTION

Figure 1:
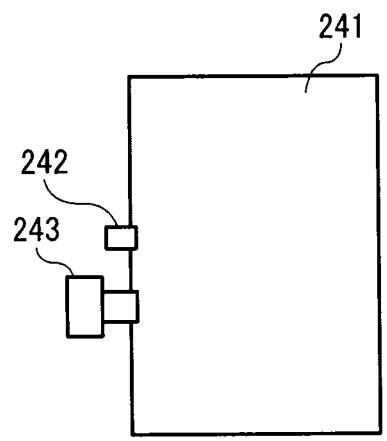
FIG. 1 is a schematic diagram illustrating an example of the ink cartridge according to an embodiment of the present invention.

When the copolymer of the present disclosure is used as a binder resin in an aqueous ink, images having a high resolution and clarity can be formed on various recording media even at high performance.

In addition, if the copolymer of the present disclosure is used as a dispersion resin of a pigment, a stable dispersion element of a pigment having a high level of dispersibility is obtained.

In addition, high image density is achieved even on plain paper by an aqueous ink using the copolymer of the present disclosure. Moreover, the aqueous ink has excellent storage stability and does not cause beading even at high performance.

Embodiments of the present disclosure are described below with reference to accompanying drawings.

Embodiment 1 of the present disclosure is a copolymer which contains a structure unit represented by Chemical formula 1 and a structure unit represented by Chemical formula 2,

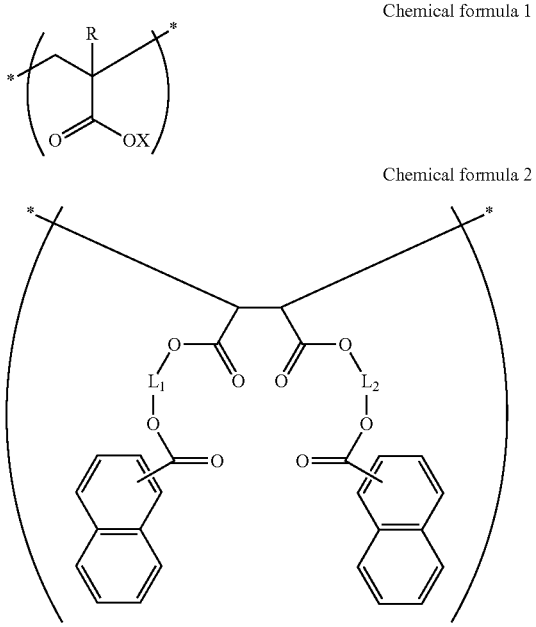

Chemical formula 1

Chemical formula 2 where R represents a hydrogen atom or a methyl group, X represents a hydrogen atom or a cation, L1 and L2 each, independently represent alkylene groups having 2 to 18 carbon atoms.

Embodiment 1 of the present disclosure described above includes the following embodiments 2 to 7 for copolymer, aqueous ink, and ink cartridge. These are also described in detail below.

2. The copolymer mentioned in 1, wherein the ratio of the structure unit represented by Chemical formula 1 to the structure unit represented by Chemical formula 2 ranges from 1:1 to 5:1.
3. The copolymer mentioned in 1 or 2, wherein L1 and L2 in the structure unit represented by Chemical formula 2 each, independently represent alkylene groups having 2 to 12 carbon atoms.
4. An aqueous ink containing water, a coloring material, and the copolymer mentioned in any one of 1 to 3.
5. The aqueous ink mentioned in 4, wherein the coloring material is a pigment.
6. The aqueous ink mentioned in 4 or 5, further containing one or more water soluble organic solvent and/or one or more surfactant.
7. An ink cartridge containing a container to accommodate the aqueous ink mentioned in any one of 4 to 6.

As described above, the copolymer for use in the aqueous ink of the present disclosure has the structure unit represented by Chemical formula 1 and the structure unit represented by Chemical formula 2 in its main chain or sidechain. In Chemical formula 1, R represents a hydrogen atom or a methyl group, X represents a hydrogen atom or a cation. When X is a cation, the oxygen adjacent to the cation is existent as $O^-$. Specific examples of the cation include, but are not limited to, sodium ion, potassium ion, lithium ion, tetramethyl ammonium ion, tetraethyl ammonium ion, tetrapropyl ammonium ion, tetrabutyl ammonium ion, tetrapentyl ammonium ion, tetrahexyl ammonium ion, triethylmethyl ammonium ion, tributylmethyl ammonium ion, trioctylmethyl ammonium ion, 2-hydroxyethyl trimethyl ammonium ion, tris(2-hydroxyethyl)methyl ammonium ion, propyltrimethyl ammonium ion, hexyltrimethyl ammonium ion, octyltrimethyl ammonium ion, nonyltrimethyl ammonium ion, decyltrimethyl ammonium ion, dodecyltrimerthyl ammonium ion, tetradecyltrimethyl ammonium ion, hexadecyl trimethyl ammonium ion, octadecyl trimethyl ammonium ion, didodecyl dimethyl ammonium ion, ditetradecyl dimethyl ammonium ion, dihexyadecyl dimethyl ammonium ion, dioctadecyl dimethyl ammonium ion, ethylhexadecyl dimethyl ammonium ion, ammonium ion, dimethyl ammonium ion, trimethyl ammonium ion, monoethyl ammonium ion, diethyl ammonium ion, triethyl ammonium ion, monoethanol ammonium ion, diethanol ammonium ion, triethanol ammonium ion, methyl ethanol ammonium ion, methyldiethanol ammonium ion, dimethylethanol ammonium ion, monopropanol ammonium ion, dipropanol ammonium ion, tripropanol ammonium ion, isopropanol ammonium ion, morpholinium ion, N-methyl morpholinium ion, N-methyl-2-pyrolidonium ion, and 2-pyrolidonium ion.

In Chemical formula 2, L1 and L2 each, independently alkylene groups having 2 to 18 carbon atoms and preferably alkylene groups having 2 to 12 carbon atoms.

Although L1 and L2 can be different or the same, it is preferable that L1 and L2 are the same to secure obtaining (synthesizing) a copolymer in an easy manner. In addition, for example, to lose the uniformity of the structure of a copolymer (for example, to increase non-crystallinity by reducing crystallinity of a copolymer), it is possible to make L1 and L2 different.

However, when L1 and L2 are different, in the initial monomer synthesis to obtain such monomers, two-step reaction is conducted, which is inconvenient. When bi-functional maleic anhydride is caused to react with two different kinds of alkoxy group-modified naphthoic acid A and naphthoic acid B simultaneously, a mixture of three kinds of maleic acid esters of A-A ester, B-B ester, and A-B ester are produced so that it is necessary to separate the target A-B ester from the others, which is intuitively understood. Therefore, to avoid this inconvenience, the reaction is conducted two steps with care and in the middle of the reaction, non-reacted carboxylic acid and hydroxy compounds remaining after the first step reaction are removed (which is relatively easy). In addition, before the second step reaction, diester (a small amount thereof is produced in spite of the care) is separated and removed from the target monoester, which is troublesome. However, no problem occurs to polymerization itself.

Since a naphtyl group existing at the end via L1 or L2 has an excellent pigment adsorption power due to π-π stacking with pigments serving as coloring material in an aqueous ink (hereinafter referred to as ink), the pigments rapidly agglomerate on the surface of a recording medium upon contact between the group and the pigments on the recording medium so that beading can be prevented.

In addition, when a dispersion element of pigment in which a pigment is dispersed in water is prepared with the copolymer of the present disclosure, the copolymer tends to be adsorbed on the surface of the pigment due to the naphtyl group present at the end of the side chain of the copolymer so that a stable dispersion element having a good dispersability is obtained. To prevent beading, although it is preferable to use the copolymer of the present disclosure as an additive in terms of the agglomeration speed of a pigment on the surface of a recording medium, the copolymer can be used as a dispersant to disperse the pigment in combination.

The molar ratio of the structure unit represented by Chemical formula 1 and the structure unit represented by Chemical formula 2 forming the copolymer of the present disclosure ranges from 1:1 to 20:1, preferably from 1:1 to 10:1, and more preferably from 1:1 to 5:1 in terms of the power to adsorb a pigment.

The number average molecular weight and the weight average molecular weight of the copolymer of the present disclosure preferably range from 500 to 10,000 and 1,500 to 30,000, respectively, in polystyrene conversion.

The copolymer of the present disclosure optionally has a structure unit formed of other polymerizable monomers in addition to the structure units represented by Chemical formula 1 and Chemical formula 2.

There is no specific limit to such other polymerizable monomers. These can be selected to particular applications. Examples thereof are polymerizable hydrophobic monomers, polymerizable hydrophilic monomers, and polymerizable surfactants.

Specific examples of the polymerizable hydrophobic monomers include, but are not limited to, unsaturated ethylene monomers having an aromatic ring such as α-methyl styrene, 4-t-butyl styrene, and 4-chloromethyl styrene; (meth)acrlic acid alkyl such as methyl (meth)acrylate, ethyl (meth)acrylate, n-butyl(meth)acrylate, dimethyl maleate, dimethyl itaconate, dimethyl fumarate, lauryl(meth)acrylate (C12), tridecyl (meth)acrylate (C13), tetradecyl(meth)acrylate (C14), pentadecyl (meth)acrylate (C15), hexadecyl (meth)acrylate (C16), heptadecyl(meth)acrylate (C17), nonadecyl(meth)acrylate (C19), eicosyl(meth)acrylate (C20), heneicosyl(meth)acrylate (C21), and docosyl(meth)acrylate (C22); and unsaturated ethylene monomers having an alkyl group such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-diemthyl-1-hexene, 4,4-diemthyl-1-hexene, 1-nonene, 3,5,5-trimethyl-1-hexene, 1-decene, 1-undecene, 1-dodecene, 1-tridecene, 1-tetracene, 1-pentadecene, 1-hexadecene, 1-heptadecene, 1-octadecene, 1-nonadecene, 1-eicocene, and 1-dococene. These may be used alone or in combination of two or more thereof.

Specific examples of the polymerizable hydrophilic monomers include, but are not limited to, anionic unsaturated ethylene monomers such as maleic acid or salts thereof, monomethyl maleate, itaconic acid, monomethyl itaconate, fumaric acid, 4-styrene sulfonic acid, 2-acrylic amide-2-methyl propane sulfonic acid, or anionic unsaturated ethylene monomers having phosphoric acid, phosphonic acid, alendronic acid, or etidronic acid; and nonionic unsaturated ethylene monomers such as 2-hydroxyethyl (meth)acrylic acid, diethylene glycol mono(meth)acrylate, triethylene glycol mono(meth)acrylate, tetraethylene glycol mono(meth)acrylate, polyethylene glycol mono(meth)acrylate, (meth)acrylamide, N-methylol(meth)acrylamide, N-vinyl formamide, N-vinylacetoamide, N-vinylpyrolidone, acrylamide, N,N-dimethyl acrylamide, N-t-butyl acrylamide, N-octyl acrylamide, and N-t-octyl acrylamide.

One or more kinds of the polymerizable hydrophilic monomers and polymerizable hydrophobic monomers are mixed and the mixture account for 5% by weight to 100% by weight of the total of the monomers (e.g., monomer represented by Chemical formula 3 or Chemical formula 4) forming the structure units represented by Chemical formula 1 and Chemical formula 2.

Chemical formula 3

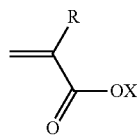

Chemical formula 4

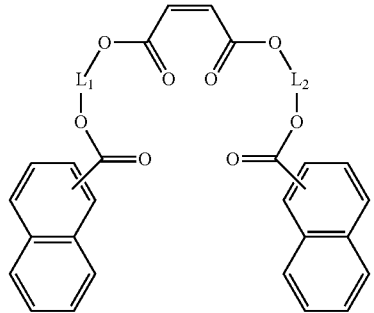

The polymerizable surfactant is an anionic or nonionic surfactant having at least one radically-polymerizable unsaturated double bond group in its molecule.

Specific examples of the anionic surfactant include, but are not limited to, a hydrocarbon compound having a sulfate salt group such as ammonium sulfate group ($-SO_3-NH_4^+$) and an allyl group ($-CH_2-CH=CH_2$), a hydrocarbon compound having a sulfate group such as ammonium sulfate group ($-SO_3-NH_4^+$) and a methacylic group [($-CO-C(CH_3)=CH_2$], and an aromatic hydrocarbon compound having a sulfate group such as ammonium sulfate group ($-SO_3-NH_4^+$) and a 1-propenyl group ($-CH=CH_2CH_3$).

Specific examples thereof include, but are not limited to, ELEMINOL JS-20 and RS-300 (both manufactured by Sanyo Chemical Industries, Ltd. and Aqualon KH-10, Aqualon KH-1025, Aqualon KH-05, Aqualon HS-10, Aqualon HS-1025, Aqualon BC-0515, Aqualon BC-10, Aqualon BC-1025, Aqualon BC-20, and Aqualon BC-2020 (all manufactured by DKS Co. Ltd.).

The nonionic surfactant is, for example, a hydrocarbon compound or an aromatic hydrocarbon compound having 1-propenyl group ($-CH=CH_2CH_3$) and a polyoxyethylene group $[-(C_2H_4O)_n-H]$. Specific examples thereof include, but are not limited to, Aqualon RN-20, Aqualon RN-2025, Aqualon RN-30, and Aqualon RN-50 (all manufactured by DKS Co. Ltd.) and LATEMUL PD-104, LATEMUL PD-420, LATEMUL PD-430, and LATEMUL PD-450 (all manufactured by Kao Corporation).

One or more kinds of the polymerizable surfactants are mixed and the mixture accounts for 0.1% by weight to 10% by weight of the monomer forming the structure unit represented by Chemical formula 1 or Chemical formula 2.

The copolymer of the present disclosure is prepared as in the following chemical reaction 1, 2, and 3: naphthalene carboxylic acid hydroxy alkyl ester (A-2) is obtained by condensation reaction between naphthalene carbonyl chloride (A-1) and an excessive amount of diol compound under the presence of acid acceptor such as amine and pyridine. Thereafter, maleic anhydride (A-3) and (A-2) are caused to react to obtain maleic acid diester element monomer (A-4). Thereafter, under the presence of a radical polymerization initiator, (A-4) was caused to conduct copolymerization with (meth)acrylic monomer (A-5) to obtain the copolymer (A-6) of the present disclosure.

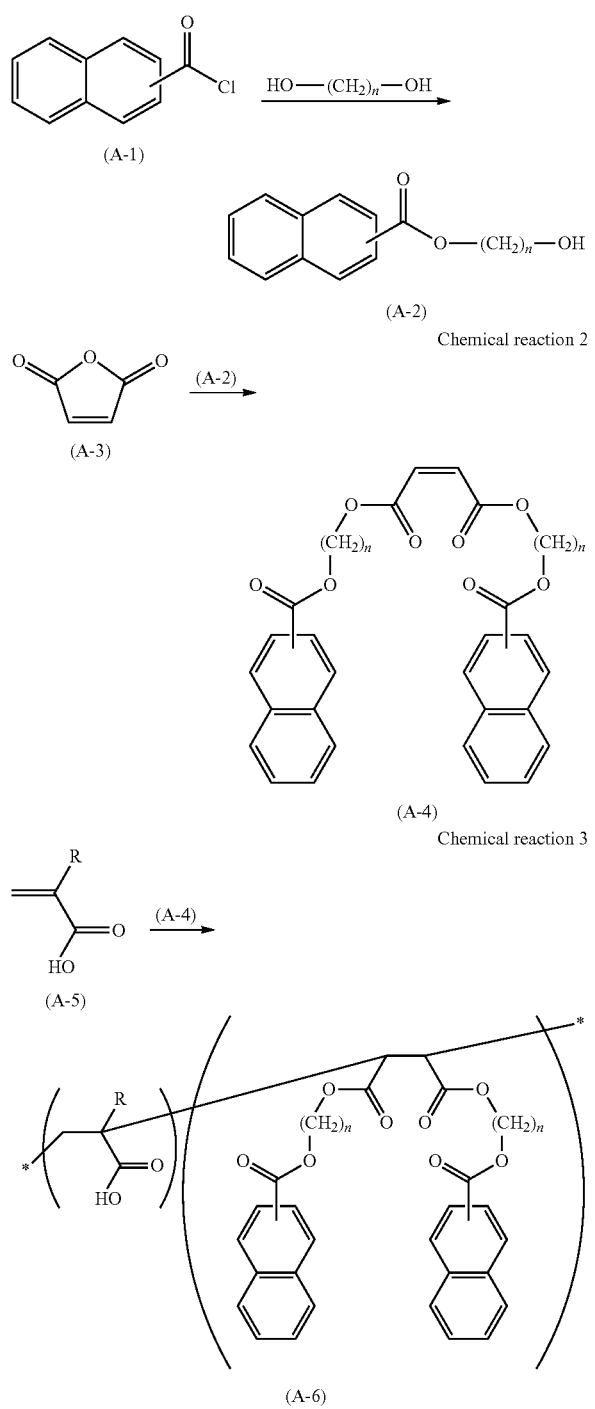

There is no specific limit to the selection of the radical polymerization initiator.

The radical polymerization initiator can be selected to particular applications. Specific examples thereof include, but are not limited to, peroxy ketal, hydroperoxide, dialkyl peroxide, diacylperoxide, peroxydicarbonate, peroxyester, cyano-based azobisisobutylonitrile, azobis(2-methylbutylonitrile), azobis(2,2'-isovaleronitrile), and non-cyano-based dimethyl-2,2'azobis isobutylate. Of these, organic peroxides and azo-based compounds are preferable and azo compounds are particularly preferable in terms of easiness of molecular weight control and low resolution temperature.

In addition, there is no specific limit to the content of the radical polymerization initiator and the content can be determined to a particular application. The content thereof is preferably from 1% by weight to 10 by weight based on the total amount of the polymerizable monomer.

To control the molecular weight of the copolymer, a chain transfer agent is optionally added.

Specific examples thereof include, but are not limited to, mercapto acetate, mercapto propionate, 2-propane thiol, 2-meracapto ethanol, thiophenol, dodecyl mercaptane, 1-dodecane thiol, and thioglycerol.

There is no specific limit to the polymerization temperature. The polymerization temperature is preferably from 50 degrees C. to 150 degrees C. and more preferably from 60 degrees C. to 100 degrees C. There is no specific limit to the polymerization time. The polymerization time can be suitably selected to a particular application. It is preferably from 3 hours to 48 hours.

Pigments and dyes can be used as the coloring material for the aqueous ink of the present disclosure. With regard to the adsorption power of the copolymer for a coloring material, pigments are superior to dyes. Moreover, pigments are preferable in terms of water resistance and light resistance.

There is no specific limit to the selection of pigments. These can be selected to particular applications. For example, inorganic pigments or organic pigments for black or color are suitable. These can be used alone or in combination.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), metal oxides such as titanium oxides, and organic pigments such as aniline black (C.I. Pigment Black 1).

It is suitable to use carbon black manufactured by a furnace method or channel method, which has a primary, particle diameter of from 15 nm to 40 nm, a specific surface area of from 50 $m^2/g$ to 300 $m^2/g$ according to Brun-auer-Emmett-Teller (BET) method, a dibutylphthalate(DPB) absorption oil amount of from 40 ml/100 g to 150 ml/100 g, a volatile content of from 0.5 percent to 10 percent, and pH of from 2 to 9.

Specific examples of the organic pigments include, but are not limited to, azo pigments (azo lakes, insoluble azo pigments, condensed azo pigments, chelate azo pigments, etc.), polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinofuranone pigments, etc.), dye chelates (basic dye type chelates, acid dye type chelates), nitro pigments, nitroso pigments, and aniline black.

Of these pigments, in particular pigments having good affinity with water are preferably used.

Specific examples of the azo pigments include, but are not limited to, azo lake, insoluble azo pigments, condensation azo pigments, and chleate azo pigments.

Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindolinone pigments, quinofuranone pigments, and, Rhodamine B lake pigments.

Specific examples of the dye chleates include, but are not limited to, bass dye type chleates, and acid dye type chleates.

There is no specific limit to the selection of the pigment for yellow, which can be selected to a particular application.

Specific examples thereof include, but are not limited to, C.I.Pigment Yellow 1, C.I.Pigment Yellow 2, C.I.Pigment Yellow 3, C.I.Pigment Yellow 12, C.I.Pigment Yellow 13, C.I.Pigment Yellow 14, C.I.Pigment Yellow 16, C.I.Pigment Yellow 17, C.I.Pigment Yellow 73, C.I.Pigment Yellow 74, C.I.Pigment Yellow 75, C.I.Pigment Yellow 83, C.I.Pigment Yellow 93, C.I.Pigment Yellow 95, C.I.Pigment Yellow 97, C.I.Pigment Yellow 98, C.I.Pigment Yellow 114, C.I.Pigment Yellow 120, C.I.Pigment Yellow 128, C.I.Pigment Yellow 129, C.I.Pigment Yellow 138, C.I.Pigment Yellow 150, C.I.Pigment Yellow 151, C.I.Pigment Yellow 154, C.I.Pigment Yellow 155, C.I.Pigment Yellow 174, and C.I.Pigment Yellow 180.

There is no specific limit to the selection of the pigment for magenta, which can be selected to a particular application.

Specific examples thereof include, but are not limited to, C.I.Pigment Red 5, C.I.Pigment Red 7, C.I.Pigment Red 12, C.I.Pigment Red 48 (Ca), C.I.Pigment Red 48 (Mn), C.I.Pigment Red 57 (Ca), C.I.Pigment Red 57:1, C.I.Pigment Red 112, C.I.Pigment Red 122, C.I.Pigment Red 123, C.I.Pigment Red 146, C.I.Pigment Red 168, C.I.Pigment Red 176, C.I.Pigment Red 184, C.I.Pigment Red 185, C.I.Pigment Red 202, and C.I.Pigment Violet 19.

There is no specific limit to the selection of the pigment for cyan, which can be selected to a particular application.

Specific examples thereof include, but are not limited to, C.I.Pigment Blue 1, C.I.Pigment Blue 2, C.I.Pigment Blue 3, C.I.Pigment Blue 15, C.I.Pigment Blue 15:3, C.I.Pigment Blue 15:4, C.I.Pigment Blue 15:34, C.I.Pigment Blue 16, C.I.Pigment Blue 22, C.I.Pigment Blue 60, C.I.Pigment Blue 63, C.I.Pigment Blue 66, C.I.Pigment Pat Blue 4, and C.I.Pigment Pat Blue 60.

By using C.I.Pigment Yellow 74 as yellow pigment, C.I.Pigment Red 122 and C.I.Pigment Violet 19 as magenta pigment, and C.I.Pigment Blue 15:3 as cyan pigment, a well-balanced ink is obtained which has excellent color tone and light resistance.

Colorants newly manufactured for the present disclosure can be used as the ink for the present disclosure.

In addition, in terms of coloring of obtained images, it is suitable to use a self-dispersion pigment and preferable to use anionic self-dispersion pigment. The anionic self-dispersion pigment is formed by introducing an anionic functional group to the surface of a pigment directly or via another atomic group for stable dispersion to stabilize dispersion.

Conventional pigments can be used as the pigment before stable dispersion.

In the anionic functional group, more than a half of hydrogen ions are dissociated at pH 7.0. Specific examples of the anionic functional groups include, but are not limited to, a carboxyl group, a sulfo group, and a phosphonic acid group. Of these, to improve the optical density of obtained images, a carboxyl group or a phosphonic acid group is preferable.

An anionic functional group is introduced into the surface of a pigment by, for example, oxidation treatment of carbon black.

Specifically, there are methods using hypochlorite, ozone water, hydrogen peroxide, chlorite, or nitric acid for oxidization treatment or methods using a diazonium salt for surface treatment.

In addition, specific examples of the commercially available pigment having a surface into which a hydrophilic group is introduced include, but are not limited to, CW-1, CW-2, and CW-3 (all manufactured by Orient Chemical Industries Co., Ltd.), and CAB-O-JET200, CAB-O-JET300, and CAB-O-JET400 (all manufactured by Cabot Corporation).

There is no specific limit to the amount of the pigment in an aqueous ink. The amount can be suitably selected to a particular application. The amount preferably ranges from 0.5 percent by weight to 20 percent by weight and more preferably ranges from 1 percent by weight to 10 percent by weight.

The above-described dye can be selected from dyes classified as acid dyes, direct dyes, basic dyes, reactive dyes, and food dyes in the Colour Index.

Specific examples of the acid dyes and food dyes include, but are not limited to, C.I. Acid Black 1, 2, 7, 24, 26, and 94, C.I. Acid Yellow 17, 23, 42, 44, 79, and 142, C.I. Acid Blue 9, 29, 45, 92, and 249, C.I. Acid Red 1, 8, 13, 14, 18, 26, 27, 35, 37, 42, 52, 82, 87, 89, 92, 97, 106, 111, 114, 115, 134, 186, 249, 254, and 289, C.I. Food Black 1 and 2, C.I. Food Yellow 3 and 4, and C.I. Food Red 7, 9, and 14. Specific examples of the direct dyes include, but are not limited to, C.I. Direct Black 19, 22, 32, 38, 51, 56, 71, 74, 75, 77, 154, (168), and 171, C.I. Direct Yellow 1, 12, 24, 26, 33, 44, 50, 86, 120, 132, 142, and 144, C.I. Direct Blue 1, 2, 6, 15, 22, 25, 71, 76, 79, 86, 87, 90, 98, 163, 165, 199, and 202, C.I. Direct Red 1, 4, 9, 13, 17, 20, 28, 31, 39, 80, 81, 83, 89, 225, and 227, and C.I. Direct Orange 26, 29, 62, and 102. Specific examples of the basic dyes include, but are not limited to, C.I. Basic Black 2 and 8, C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, and 91, C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155, and C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112. Specific examples of the reactive dyes include, but are not limited to, C.I. Reactive Black 3, 4, 7, 11, 12, and 17, C.I. Reactive Yellow 1, 5, 11, 13, 14, 20, 21, 22, 25, 40, 47, 51, 55, 65, and 67, C.I. Reactive Blue 1, 2, 7, 14, 15, 23, 32, 35, 38, 41, 63, 80, and 95, and C.I. Reactive Red 1, 14, 17, 25, 26, 32, 37, 44, 46, 55, 60, 66, 74, 79, 96, and 97.

The aqueous ink of the present disclosure preferably includes a water-soluble organic solvent in order to enhance the permeation of the aqueous ink into plain paper, coated paper, etc., thereby further suppressing the occurrence of beading and preventing the ink from drying due to moisturizing effect.

There is no specific limit to the selection of the water soluble organic solvent. Specific examples thereof include, but are not limited to, polyhydric alcohols such as ethylene glycol, diethylene glycol, triethylene glycol, tetraethylene glycol, polyethylene glycol, propylene glycol, dipropylene glycol, tripropylene glycol, polypropylene glycol, 1,3-butanediol, 3-methyl-1,3-butanediol, trimethylolethane, trimethylolpropane, 1,5-pentanediol, 1,6-hexanediol, hexylene glycol, glycerin, 1,2,3-butanetriol, 1,2,4-butanetriol, 1,2,6-hexanetriol, isopropylidene glycerol, and petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyhydric alcohol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam, and γ-butyrolactone; amides such as formamide, N-methylformamide, N,N-dimethylformamide, 3-methoxy-N,N-dimethyl propionamide, and 3-buthoxy-N,N-dimethyl propionamide; amines such as monoethanolamine, diethanolamine, triethanolamine, monoethylamine, diethylamine, and triethylamine; sulfur-containing compounds such as dimethyl sulfoxide, sulfolane, and thiodiethanol; 3-ethyl-3-hydroxymethyloxetane, propylene carbonate, and ethylene carbonate. These can be used alone or in combination.

Of these, in terms of prevention of curling of plain paper, preferred are 3-ethyl-3-hydroxymethyloxetane, isopropylidene glycerol, 3-methoxy-N,N-dimethyl propionamide, and 3-buthoxy-N,N-dimethyl propionamide.

Of these, diethylene glycol, triethylene glycol, 1,3-butanediol, 2,2,4-trimethyl-1,3-pentanediol, and glycerin are excellent to prevent discharge failure caused by evaporation of water.

Specific examples of the water soluble organic solvents having permeation property and relatively low level of wettability include, but are not limited to, 2-ethyl-1,3-hexanediol [solubility: 4.2% (25 degrees C.)] and 2,2,4-trimethyl-1,3-pentanediol [solubility: 2.0 percent (25 degrees C.)].

Specific examples of the other water soluble organic solvents include, but are not limited to, aliphatic diols such as 2-ethyl-2-methyl-1,3-propanediol, 2,2-diethyl-1,3-propanediol, 2-methyl-2-propyl-1,3-propanediol, 3,3-dimethyl-1,2-butanediol, 2,4-dimethyl-2,4-pentanediol, 2,5-dimethyl-2,5-hexanediol, and 5-hexene-1,2-diol.

Another water-soluble organic solvent that can be used in combination with the above-described water soluble organic solvent can be appropriately selected to a particular application from alkyl or aryl ethers of polyhydric alcohols such as diethylene glycol monobutyl ether, propyleneglycol monobutyl ether, ethylene glycol monophenyl ether, diethylene glycol monophenyl ether, ethylene glycol monoallyl ether, and tetraethylene glycol chlorophenyl ether; and lower alcohols such as ethanol.

The aqueous ink of the present disclosure preferably includes a surfactant in order to enhance the permeation of the aqueous ink into plain paper, coated paper, etc., thereby further suppressing the occurrence of beading.

As the surfactants, for example, fluorine-containing surfactants, silicone-based surfactants, anionic surfactants, nonionic surfactants, and betaine-based surfactants can be suitably used.

These surfactants can be used alone or in combination.

Of these, fluorine-containing surfactants and silicone-based surfactants are preferable because it can lower the surface tension of an ink to 30 mN/m or less.

The fluorine-containing surfactant include anionic fluorine-containing surfactants, nonionic fluorine-containing surfactants, amphoteric fluorine-containing surfactants, and oligomer type fluorine-containing surfactants. Of these, the fluorine-containing surfactant having 2 to 16 fluorine-substituted carbon atoms is preferable and the one having 4 to 16 fluorine-substituted carbon atoms is more preferable. When the number of the carbon atoms is below 2, the specific effect of fluorine atoms may not be demonstrated. When the number of the carbon atom surpasses 16, storage problem may arise.

Specific examples of the nonionic fluorine-containing surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in its side chain are particularly preferable because of its low level of foaming property and more preferred are fluorine-containing surfactants represented by the following chemical formula 5.

CF$_3$CF$_2$(CF$_2$CF$_2$)$_m$—CF$_2$CF$_2$(CF$_2$CF$_2$)$_n$H     Chemical formula 5

In Chemical formula 5, m represents 0 to 10 and n represents 0 to 40.

Examples of the anionic fluorine-containing surfactants include, but are not limited to, perfluoroalkyl sulfonic acid compounds, perfluoroalkyl carboxylic acid compounds, perfluoroalkyl phosphoric acid ester compounds, and polyoxyalkylene ether polymer compounds having a perfluoroalkyl ether group in its side chain.

Specific examples of the perfluoroalkyl sulfonic acid compounds include, but are not limited to, perfluoroalkyl sulfonic acid and salts of perfluoroalkylsulfonic acid.

Specific examples of the perfluoroalkyl carboxylic acid compounds include, but are not limited to, perfluoroalkyl carboxylic acid and salts of perfluoroalkyl carboxylic acid.

Specific examples of the perfluoroalkyl phosphoric acid ester compounds include, but are not limited to, perfluoroalkyl phosphoric acid esters and salts of perfluoroalkyl phosphoric acid esters.

Specific examples of the polyoxyalkylene ether polymer compounds having a perfluoroalkyl ether group in its side chain include, but are not limited to, polyoxyalkylene ether polymers having a perfluoroalkyl ether group in its side chain, sulfuric acid ester salts of polyoxyalkylene ether polymer having a perfluoroalkyl ether group in its side chain, and salts of polyoxyalkylene ether polymers having a perfluoroalkyl ether group in its side chain.

Counter ions of salts in these fluorine-containing surfactants are, for example, Li, Na, K, NH$_4$, NH$_3$CH$_2$CH$_2$OH, NH$_2$(CH$_2$CH$_2$OH)$_2$, and NH(CH$_2$CH$_2$OH)$_3$.

Specific examples of the fluorine-containing surfactants available on market include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, and FS-300 UR (all manufactured by E. I. du Pont de Nemours and Company); FTERGENT FT-110, FT-250, FT-251, FT-400S, FT-150, and FT-400SW (all manufactured by NEOS COMPANY L1 MITED); and POLYFOX PF-136A, PF-156A, PF-151N, PF-154, PF-159 (manufactured by OMNOVA SOLUTIONS INC.).

Of these, in particular, preferred are FS-300 (manufactured by E. I. du Pont de Nemours and Company), FT-110, FT-250, FT-251, FT-400S, FT-150, and FT-400SW (all manufactured by NEOS COMPANY L1 MITED), and PolyFox PF-151N (manufactured by OMNOVA Solutions Inc.)

because good printing quality is achieved and, in particular, color development and level dyeing capability for paper are extremely enhanced.

There is no specific limit to the silicone-based surfactant. The silicone-based surfactant can be suitably selected to a particular application. Specific examples thereof include, but are not limited to, side-chain-modified polydimethyl siloxane, both end-modified polydimethylsiloxane, one end modified polydimethylsiloxane, and side-chain both end modified polydimethylsiloxane. In particular, a polyether-modified silicone-containing surfactant that has a polyoxyethylene group or a polyoxyethylene polyoxypropylene group is preferable because of its good characteristics as an aqueous surfactant.

Commercial silicone-based surfactants are easily available from, for example, BYK Japan KK, Shin-Etsu Chemical Co., Ltd., Dow Corning Toray Silicone Co., Ltd., NIHON EMULSION Co., Ltd., or Kyoeisha Chemical Co., Ltd.

Specific examples of the anionic surfactants include, but are not limited to, polyoxyethylene alkyl ether acetates, dodecyl benzene sulfonates, laurates, and salts of polyoxyethylene alkyl ether sulfates.

Specific examples of the nonionic surfactants include, but are not limited to, polyoxyethylene alkyl ether, polyoxypropylene alkyl ether, polyoxyethylene alkyl esters, polyoxy ethylene sorbitan aliphatic esters, polyoxyethylene alkyl phenyl ethers, polyoxyethylene alkyl amines, and polyoxyethylenealky amides.

Known additives such as pH regulators, preservatives and fungicides, corrosion inhibitors, anti-oxidants, ultraviolet absorbers, oxygen absorbers, and light stabilizers can be optionally selected and added to the ink of the present disclosure.

The pH regulator can be any agent capable of adjusting the pH in the range of from 8.5 to 11 without having an adverse impact on formulated ink and suitably selected to a particular application.

Specific examples thereof include, but are not limited to, alcohol amines, hydroxides of alkali metal elements, hydroxides of ammonium, phosphonium hydroxides, and alkali metal carbonates.

Specific examples of the alcohol amines include, but are not limited to, diethanol amine, triethanol amine, and 2-amino-2-ethyl-1,3-propane diol.

Specific examples of the alkali metal hydroxides include, but are not limited to, lithium hydroxide, sodium hydroxide, and potassium hydroxide.

Specific examples of the hydroxides of ammonium include, but are not limited to, ammonium hydroxide and quaternary ammonium hydroxide.

A specific example of the phosphonium hydroxides is quaternary phosphonium hydroxide.

Specific examples of the alkali metal carbonates include, but are not limited to, lithium carbonate, sodium carbonate, and potassium carbonate.

Specific examples of the preservatives and fungicides include, but are not limited, dehydrosodium acetate, sodium sorbinate, 2-pyridine thiol-1-oxide sodium, sodium benzoate, and pentachlorophenol sodium.

Specific examples of the corrosion inhibitors include, but are not limited to, acid sulfite, thiosodium sulfate, thiodiglycolate ammon, diisopropyl ammonium nitrite, pentaerythritol tetranitrate, and dicyclohexyl ammonium nitrite.

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Specific examples of the ultraviolet absorbers include, but are not limited to, benzophenone-based ultraviolet absorbers, benzotriazole-based ultraviolet absorbers, salicylate-based ultraviolet absorbers, cyanoacrylate-based ultraviolet absorbers, and nickel complex salt-based ultraviolet absorbers.

The aqueous ink of the present disclosure can be produced by, for example, dispersing or dissolving, in an aqueous medium, water, a water soluble organic solvent, a pigment, the above-described copolymer, and optional other components followed by stirring and mixing. The copolymer may be used as a pigment dispersion resin during preparation of a pigment dispersion.

This dispersion is conducted by a sand mill, a homogenizer, a ball mill, a paint shaker, an ultrasonic dispersing agent, etc. The stirring and mixing can be conducted by a stirrer having a typical stirring wing, a magnetic stirrer, a high speed dispersing device, etc. During the production, coarse particles are optionally filtered off with a filter, a centrifuge, etc. optionally followed by degassing.

There is no specific limit to the properties of the aqueous ink of the present disclosure so that the the properties can be selected to a particular application. For example, it is preferable that viscosity, surface tension, etc, are in the following ranges.

The viscosity of the ink is from 3 mPa·S to 20 mPa·S at 25 degrees C. When the ink viscosity is 3 mPa·S or greater, the printing density and the printing quality of the ink are improved. When the ink viscosity is 20 mPa·s or less, a suitable ink discharging property is secured.

The viscosity can be measured by, for example, a viscometer (RE-80L, manufactured by TOKI SANGYO CO., LTD.) at 25 degree C.

The surface tension of the aqueous ink is preferably 40 mN/m or less at 25 degrees C.

The ink cartridge of the present disclosure has the aqueous ink in a container and other optional other members.

There is no specific limit to the container. The form, the structure, the size, and the material thereof can be suitably determined to particular applications. For example, a container having at least an ink bag formed of aluminum laminate film, a resin film, etc. is suitable.

Figure 2:
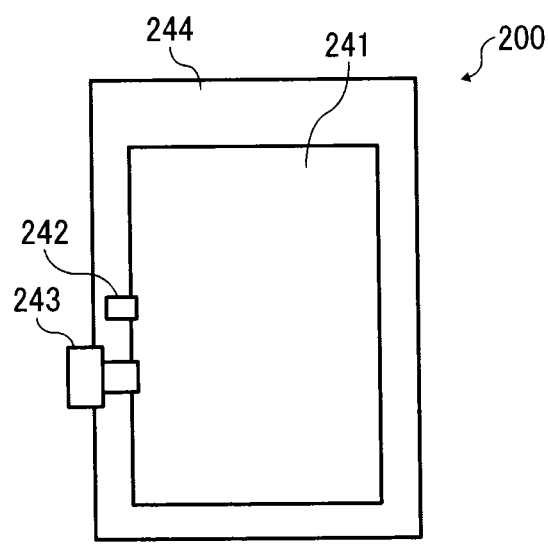
FIG. 2 is a diagram illustrating the ink cartridge illustrated in FIG. 1 including its housing.

Next, the ink cartridge is described in detail with reference to FIGS. 1 and 2. FIG. 1 is a diagram illustrating an example of the ink cartridge. FIG. 2 is a view illustrating the ink cartridge illustrated in FIG. 1 including the housing thereof. In an ink cartridge 200, an ink is supplied to an ink bag 241 through an ink inlet 242, the air remaining in the ink accommodating unit 241 is discharged, and thereafter the ink inlet 242 is closed by fusion.

When in use, an ink outlet 243 made of rubber is pierced by the needle installed onto an inkjet recording device to supply the ink into the device. The ink bag 241 is formed of a packaging material such as aluminum laminate film having no air permeability. The ink bag 241 is accommodated in a cartridge housing 244 made of plastic as illustrated in FIG. 2 and detachably attachable to various inkjet recording devices for use.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Measuring of Molecular Weight of Copolymer

In addition, the molecular weight of the copolymers obtained in Examples and Comparative Examples were obtained as follows:

The molecular weight was measure by Gel Permeation Chromatography (GPC) under the following conditions:
Device: GPC-8020 (manufactured by TOSOH CORPORATION)
Column: TSK G2000 HXL and G4000 HXL (manufactured by TOSOH CORPORATION)
Temperature: 40 degrees C.
Solvent: tetrahydrofuran (THF)
Flow speed: 1.0 ml/minute 1 mL of the copolymer having a concentration of 0.5 percent by weight was infused into the column and the number average molecular weight Mn and the weight average molecular weight Mw were calculated by using the molecular weight calibration curve obtained based on a simple dispersion polystyrene standard sample from the molecular weight distribution of the copolymer measured under the conditions specified above.

Example 1 (Synthesis Example 1)

Synthesis of Copolymer 1

15.6 g (252 mmol) of ethylene glycol (manufactured by TOKYO CHEMICAL INDUSTRY CO., LTD.) was dissolved in 100 mL of dehydrated methylene chloride (manufactured by Kanto Chemical Co., Inc.) and 3.49 g (44.0 mmol) of pyridine was added to the solution followed by cooling down with ice water. To this solution, a solution in which 8.00 g (42.0 mmol) of 2-naphthalene carbonyl chloride (manufactured by TOKYO CHEMICAL INDUSTRY CO., LTD.) was dissolved in 80 mL of methylene chloride was dripped in one hour while being stirred. Subsequent to two hour stirring, the resultant was stirred for six hours at room temperature. The reaction solution was rinsed with water and thereafter the organic phase was isolated followed by drying with magnesium sulfate (manufactured by Kanto Chemical Co., Inc.) and the solvent was distilled away. The remainder was refined by silica gel column chromatography with a solvent mixture of a methylene chloride (manufactured by JUNSEI CHEMICAL CO., LTD.) and methanol (manufactured by Kanto Chemical Co., Inc.) with a volume ratio of 97:3 serving as an eluent to obtain 6.88 g of 2-naphthoic acid 2-hydroxyethyl ester.

Thereafter, 1.50 g (15.3 mmol) of maleic anhydride (manufactured by TOKYO CHEMICAL INDUSTRY CO., LTD.) and 6.95 g (32.1 mmol) of 2-naphthoic acid-2-hydroxyethylester were dissolved in 20 mL of dried methylethyl ketone (manufactured by Kanto Chemical Co., Inc.) followed by reflux for ten hours. After cooled down to room temperature, the solvent was distilled away. The remainder was dissolved in 40 mL of dehydrated methylene chloride (JUNSEI CHEMICAL CO., LTD.). 3.41 g (33.7 mmol) of tetraethyl amine (manufactured by TOKYO CHEMICAL INDUSTRY CO., LTD.) and 0.19 g (1.53 mmol) of 4-dimethylamino pyridine (manufactured by TOKYO CHEMICAL INDUSTRY CO., LTD.) were added to the solution. While the thus-obtained solution was being stirred at room temperature in argon atmosphere, 6.32 g (18.4 mmol) of 2-methyl-6-nitro benzoic anhydride (manufactured by TOKYO CHEMICAL INDUSTRY CO., LTD.) was added. After the resultant was stirred at room temperature for 20 hours, saturated ammonium chloride aqueous solution (manufactured by Kanto Chemical Co., Inc.) was added After extraction by methylene chloride (JUNSEI CHEMICAL CO., LTD.) and rinsed with water, the isolated organic phase was dried by magnesium sulfate to distill away the solvent. The remainder was refined by silica gel column chromatography with a solvent mixture of methylene chloride (manufactured by JUNSEI CHEMICAL CO., LTD.) and methanol (manufactured by Kanto Chemical Co., Inc.) with a volume ratio of 99:1 serving as an eluent to obtain 5.80 g of maleic acid derivative I.

Maleic acid derivative I

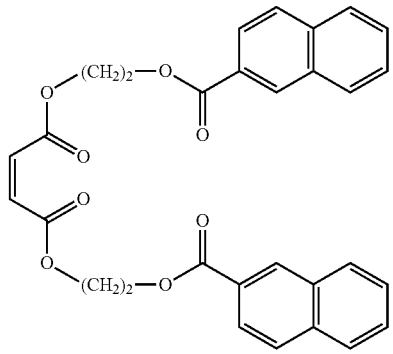

Thereafter, 5.69 g (11.1 mmol) of the maleic acid derivative I was dissolved in 15 mL of methylethylketone (manufactured by Kanto Chemical Co., Inc.) in argon atmosphere. Thereafter, the solution was heated to 75 degrees C.

To this solution, a solution in which 0.80 g (11.1 mmol) of acrylic acid (manufactured by Sigma-Aldrich Corporation) was dissolved in 10 mL of methylethylketone (manufactured by Kanto Chemical Co., Inc.) was dripped in two hours. The resultant solution was stirred at 75 degrees C. for five hours. The resultant was cooled down to room temperature and the thus-obtained reaction solution was dripped to hexane (manufactured by Kanto Chemical Co., Inc.). Thus precipitated copolymer was filtered and dried under a reduced pressure to obtain 6.12 g of a copolymer 1 (weight average molecular weight Mw: 8,800, number average molecular weight (Mn): 2,900).

Figure 3:
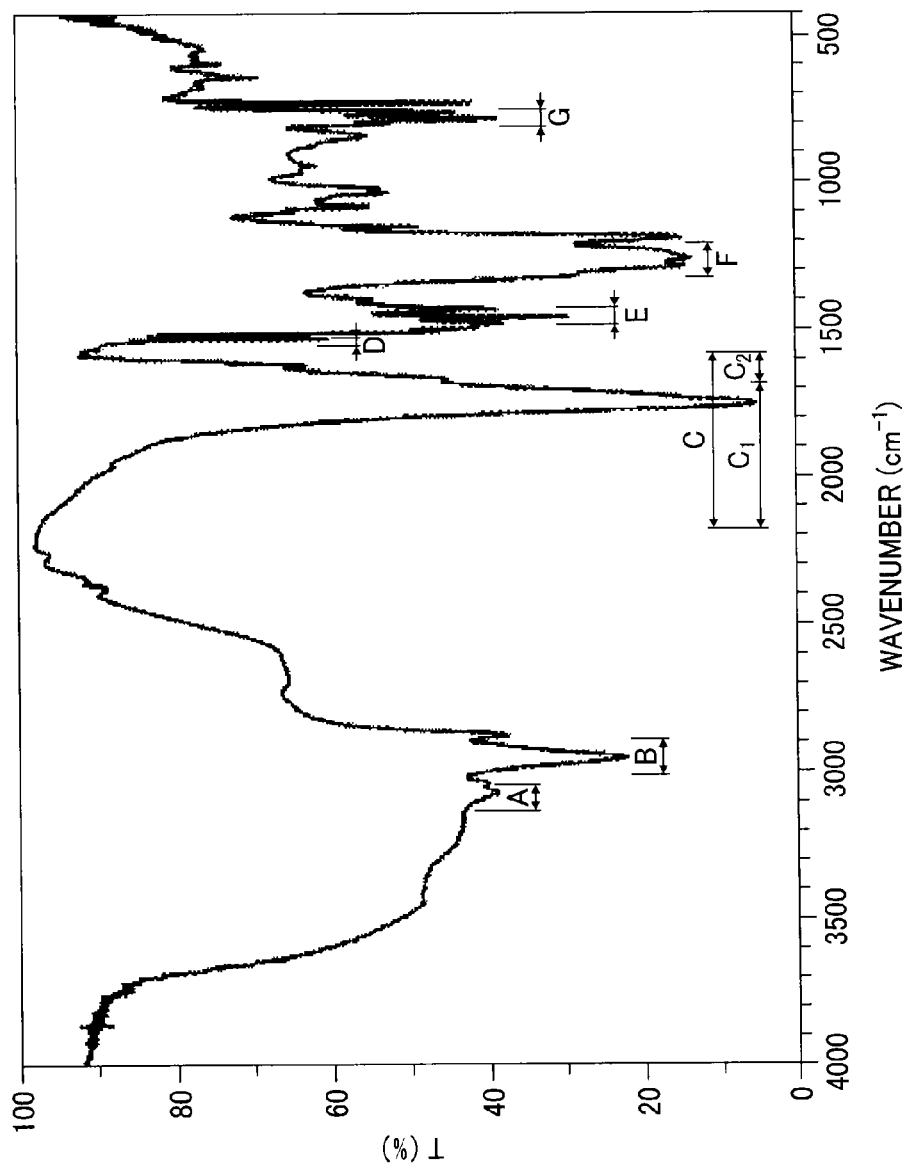
FIG. 3 is a graph illustrating IR spectrum of the copolymer obtained in Example 1 described later.

The copolymer 1 was confirmed to be the target by IR spectrum thereof. Refer to FIG. 3 for this IR spectrum of the copolymer 1. In this IR spectrum graph, in addition to the absorption peak (B in the graph) ascribable to aliphatic series C—H stretching vibration, the absorption peak (A in the graph) ascribable to aromatic series C—H stretching vibration, the strong absorption peak (C in the graph where C1 and C2 are overlapped) where C═O stretching vibration of two kinds of carboxylic acid esters are overlapped and which is slightly shifted to the short wavelength side, and the absorption peak (D in the graph) ascribable to the stretching vibration of [(C═C)+(C—C)]/2 in the aromatic ring can be confirmed. In addition, in the short wavelength region of 1500 $cm^{-1}$, which is the spectrum region inherent to a material and is so-called as "fingerprint region", the absorption peak (E in the graph) ascribable to $\delta SCH_2$ vibration, the absorption peak (F in the graph) ascribable to C—O—C inverse symmetry stretching vibration, and the absorption peak (G in the graph) ascribable to aromatic series C—H plane deformation vibration are confirmed.

Thereafter, 2.00 g of the obtained copolymer was dissolved in an aqueous solution of tetraethyl ammonium hydroxide (manufactured by TOKYO CHEMICAL INDUSTRY CO., LTD.) in such a manner that the concentration of the copolymer was 2.38 percent and the pH thereof was 8.0 to prepare an aqueous solution of the copolymer 1.

Example 2 (Synthesis Example 2)

Synthesis of Copolymer 2

Maleic acid derivative II was obtained in the same manner as in Synthesis Example 1 except that ethylene glycol was replaced with 1,6-hexanediol (manufactured by TOKYO CHEMICAL INDUSTRY CO., LTD.).

The copolymer 2 was confirmed to be the target by IR spectrum thereof in the same manner as in the copolymer 1.

Maleic acid derivative II

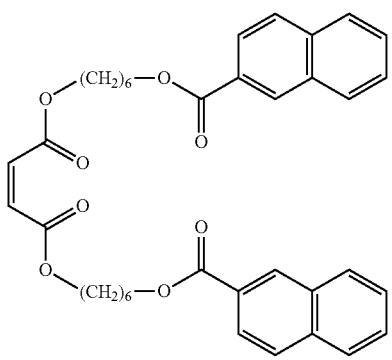

Thereafter, using acrylic acid (manufactured by Sigma-Aldrich Corporation) and the obtained maleic acid derivative II, copolymer 2 (weight average molecular weight (Mw): 9,200, number average molecular weight (Mn): 3,500) was obtained in the same manner as in Synthesis Example 1 to prepare an aqueous solution of the copolymer 2 in the same manner as in Synthesis Example 1.

Example 3 (Synthesis Example 3)

Synthesis of Copolymer 3

Maleic acid derivative III was obtained in the same manner as in Synthesis Example 1 except that ethylene glycol was replaced with 1,12-dodecanediol (manufactured by TOKYO CHEMICAL INDUSTRY CO., LTD.).

The copolymer 3 was confirmed to be the target by IR spectrum thereof in the same manner as in the copolymer 1.

Maleic acid derivative III

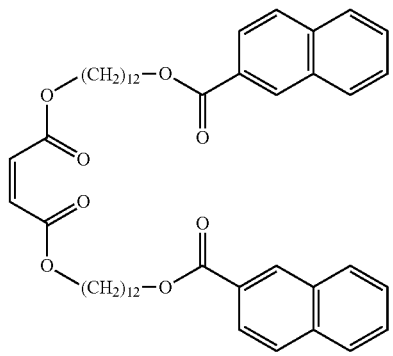

Thereafter, using acrylic acid (manufactured by Sigma-Aldrich Corporation) and the obtained maleic acid derivative III, copolymer 3 (weight average molecular weight (Mw): 9,400, number average molecular weight (Mn): 3,600) was obtained in the same manner as in Synthesis Example 1 to prepare an aqueous solution of the copolymer 3 in the same manner as in Synthesis Example 1.

Example 4 (Synthesis Example 4)

Synthesis of Copolymer 4

Maleic acid derivative IV was obtained in the same manner as in Synthesis Example 1 except that ethylene glycol was replaced with 1,16-hexadecanediol (manufactured by TOKYO CHEMICAL INDUSTRY CO., LTD.).

The copolymer 4 was confirmed to be the target by IR spectrum thereof in the same manner as in the copolymer 1.

Maleic acid derivative IV

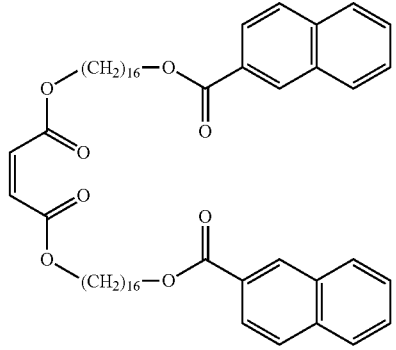

Using acrylic acid (manufactured by Sigma-Aldrich Corporation) and the obtained maleic acid derivative IV, copolymer 4 (weight average molecular weight (Mw): 9,600, number average molecular weight (Mn): 3,800) was obtained in the same manner as in Synthesis Example 1 to prepare an aqueous solution of the copolymer 4 in the same manner as in Synthesis Example 1.

Example 5 (Synthesis Example 5)

Synthesis of Copolymer 5

Using methacrylic acid (manufactured by Sigma-Aldrich Corporation) and the obtained maleic acid derivative II synthesized in Synthesis Example 2, copolymer 5 (weight average molecular weight (Mw): 9,600, number average molecular weight (Mn): 3,800) was obtained in the same manner as in Synthesis Example 1 to prepare an aqueous solution of the copolymer 5 in the same manner as in Synthesis Example 1.

Example 6 (Synthesis Example 6)

Synthesis of Copolymer 6

Using acrylic acid (manufactured by Sigma-Aldrich Corporation) and the obtained maleic acid derivative II synthesized in Synthesis Example 2, copolymer 6 (weight average molecular weight (Mw): 7,700, number average molecular weight (Mn): 3,200) was obtained in the same manner as in Synthesis Example 1 except that the molar ratio of the acrylic acid for Chemical formula 1 to the maleic acid derivative I for Chemical formula 2 was 3:1 to prepare an aqueous solution of the copolymer 6 in the same manner as in Synthesis Example 1.

Example 7 (Synthesis Example 7)

Synthesis of Copolymer 7

Using acrylic acid (manufactured by Sigma-Aldrich Corporation) and the obtained maleic acid derivative II synthesized in Synthesis Example 2, copolymer 7 (weight average molecular weight (Mw): 8,200, number average molecular weight (Mn): 3,400) was obtained in the same manner as in Synthesis Example 1 except that the molar ratio of the acrylic acid for Chemical formula 1 to the maleic acid derivative I for Chemical formula 2 was 5:1 to prepare an aqueous solution of the copolymer 7 in the same manner as in Synthesis Example 1.

Example 8 (Synthesis Example 8)

Synthesis of Copolymer 8

Using acrylic acid (manufactured by Sigma-Aldrich Corporation) and the obtained maleic acid derivative II synthesized in Synthesis Example 2, copolymer 8 (weight average molecular weight (Mw): 8,500, number average molecular weight (Mn): 3,600) was obtained in the same manner as in Synthesis Example 1 except that the molar ratio of the acrylic acid for Chemical formula 1 to the maleic acid derivative I for Chemical formula 2 was 6:1 to prepare an aqueous solution of the copolymer 8 in the same manner as in Synthesis Example 1.

Example 9 (Synthesis Example 9)

Synthesis of Copolymer 9

Using the copolymer 2 synthesized in Synthesis Example 2, 2.00 g of the copolymer was dissolved in sodium hydroxide (manufactured by Kanto Chemical Co., Inc.) in such a manner that the concentration of the copolymer was 23.8 percent by weight and the pH thereof was 8.0 to prepare an aqueous solution of copolymer 9.

Example 10 (Synthesis Example 10)

Synthesis of Copolymer 10

Using methacrylic acid (manufactured by Sigma-Aldrich Corporation) and the obtained maleic acid derivative IV, copolymer 10 (weight average molecular weight (Mw): 9,600, number average molecular weight (Mn): 3,800) was obtained in the same manner as in Synthesis Example 1 except that the molar ratio of the acrylic acid for Chemical formula 1 to the maleic acid derivative I for Chemical formula 2 was 10:1 to prepare an aqueous solution of the copolymer 10 in the same manner as in Synthesis Example 1.

Example 11 (Synthesis Example 11)

Synthesis of Copolymer 11

8.76 g (14.0 mmol) of maleic acid derivative II was dissolved in 1.01 g (14.0 mmol) of acrylic acid (manufactured by Sigma-Aldrich Corporation). 10.0 g of deionized water, 0.30 g of anionic radical reactive surfactant (Aqualon KH-10, manufactured by DKS Co. Ltd.), and 0.10 g of ammonium persulfate (manufactured by TOKYO CHEMICAL INDUSTRY CO., LTD.) were added to the solution to form a pre-emulsion by a HOMOMIXER. Thereafter, 0.2 g of Aqualon KH-10 was added to 10.0 g of deionized water, which was thereafter heated to 80 degrees C. in argon atmosphere. Thereafter, 10 percent of the pre-emulsion was added to conduct initial polymerization for 30 minutes. Thereafter, the rest of the pre-emulsion was dripped in two hours to conduct polymerization followed by further polymerization at 80 degrees C. for two hours. Subsequent to cooling down, the resultant was filtered and neutralized by ammonium water (manufactured by Kanto Chemical Co., Inc.) to obtain emulsified liquid of copolymer 11 (weight average molecular weight (Mw): 18,000, number average molecular weight (Mn): 9,800) having a solid portion concentration of 30 percent.

Example 12 (Synthesis Example 12)

Synthesis of Copolymer 12

9.36 g (15.0 mmol) of maleic acid derivative II was dissolved in 3.87 g (45.0 mmol) of methacrylic acid (manufactured by Sigma-Aldrich Corporation). 13.0 g of deionized water, 0.40 g of anionic radical reactive surfactant (Aqualon KH-10, manufactured by DKS Co. Ltd.), and 0.13 g of ammonium persulfate (manufactured by TOKYO CHEMICAL INDUSTRY CO., LTD.) were added to the solution to form a pre-emulsion by a HOMOMIXER. Thereafter, 0.2 g of Aqualon KH-10 (manufactured by DKS Co. Ltd.) was added to 10.0 g of deionized water, which was thereafter heated to 80 degrees C. in argon atmosphere. Thereafter, 10 percent of the pre-emulsion was added to conduct initial polymerization for 30 minutes. Thereafter, the rest of the pre-emulsion was dripped in two hours to conduct polymerization followed by further polymerization at 80 degrees C. for two hours. Subsequent to cooling down, the resultant was filtered and neutralized by ammonium water (manufactured by Kanto Chemical Co., Inc.) to obtain emulsified liquid of copolymer 12 (weight average molecular weight (Mw): 15,000, number average molecular weight (Mn): 9,200) having a solid portion concentration of 30 percent by weight.

The structures of the copolymers of Synthesis Examples 1 to 12 are shown in Table 1.

Comparative Example 1 (Comparative Synthesis Example 1)

Synthesis of Comparative Copolymer 1

5.00 g (50.0 mmol) of maleic anhydride (manufactured by TOKYO CHEMICAL INDUSTRY CO., LTD.) and 10.7 g (105 mmol) of 1-hexanol (manufactured by TOKYO CHEMICAL INDUSTRY CO., LTD.) were dissolved in 20 mL of dried methylethyl ketone (manufactured by Kanto Chemical Co., Inc.) followed by reflux for 12 hours and cooling-down to room temperature to remove the solvent. The remainder was dissolved in 20 mL of dehydrated methylene chloride (JUNSEI CHEMICAL CO., LTD.). 11.1 g (110 mmol) of tetraethyl amine (manufactured by TOKYO CHEMICAL INDUSTRY CO., LTD.) and 0.610 g (5.00 mmol) of 4-dimethylamino pyridine (manufactured by TOKYO CHEMICAL INDUSTRY CO., LTD.) were added to the solution. While the thus-obtained solution was being stirred at room temperature in argon atmosphere, 2.06 g (60.0 mmol) of 2-methyl-6-nitro benzoic anhydride (manufactured by TOKYO CHEMICAL INDUSTRY CO., LTD.) was added. After the resultant was stirred at room temperature for 24 hours, saturated ammonium chloride aqueous solution (manufactured by Kanto Chemical Co., Inc.) was added. After being extracted by methylene chloride (JUNSEI CHEMICAL CO., LTD.) and rinsed with water, the isolated organic phase was dried by magnesium sulfate to distill away the solvent. The remainder was refined by silica gel column chromatography with a solvent mixture of methylene chloride (manufactured by JUNSEI CHEMICAL CO., LTD.) and methanol (manufactured by Kanto Chemical Co., Inc.) with a volume ratio of from 99.5:0.5 to 99:1 serving as an eluent to obtain 5.80 g of maleic acid derivative V.

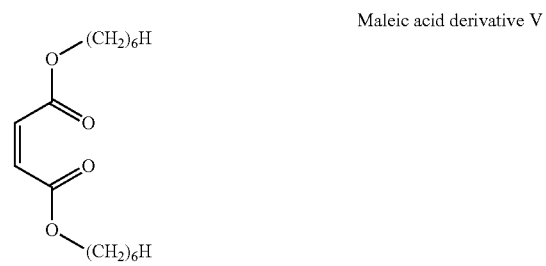

Maleic acid derivative V

Thereafter, 6.78 g of a copolymer (weight average molecular weight (Mw): 7,000, number average molecular weight (Mn): 2,400) was obtained in the same manner as in Synthesis Example 2 except that maleic acid derivative II was changed to maleic acid derivative V and thereafter an aqueous solution of comparative copolymer 1 was prepared in the same manner as in Synthesis Example 1.

Comparative Example 2 (Comparative Synthesis Example 2)

Synthesis of Comparative Copolymer 2

Thereafter, comparative copolymer 2 (weight average molecular weight (Mw): 14,000, number average molecular weight (Mn): 9,000) having a solid portion concentration of 30 percent by weight was obtained in the same manner as in Synthesis Example 12 except that maleic acid derivative II was changed to maleic acid derivative IV.

TABLE 1

| Synthesis Example No. | Copolymer No. | 1:2 (molar ratio) | R | X | L1 | L2 | Polymerization method | Mw | Mn |
|---|---|---|---|---|---|---|---|---|---|
| Synthesis Example 1 | Copolymer 1 | 1:1 | H | TEA | —$(CH_2)_2$— | —$(CH_2)_2$— | S | 8,800 | 2,900 |
| Synthesis Example 2 | Copolymer 2 | 1:1 | H | TEA | —$(CH_2)_6$— | —$(CH_2)_6$— | S | 9,200 | 3,500 |
| Synthesis Example 3 | Copolymer 3 | 1:1 | H | TEA | —$(CH_2)_{12}$— | —$(CH_2)_{12}$— | S | 9,400 | 3,600 |
| Synthesis Example 4 | Copolymer 4 | 1:1 | H | TEA | —$(CH_2)_{16}$— | —$(CH_2)_{16}$— | S | 9,600 | 3,800 |
| Synthesis Example 5 | Copolymer 5 | 1:1 | $CH_3$ | TEA | —$(CH_2)_6$— | —$(CH_2)_6$— | S | 9,600 | 3,800 |
| Synthesis Example 6 | Copolymer 6 | 3:1 | H | TEA | —$(CH_2)_6$— | —$(CH_2)_6$— | S | 7,700 | 3,200 |
| Synthesis Example 7 | Copolymer 7 | 5:1 | H | TEA | —$(CH_2)_6$— | —$(CH_2)_6$— | S | 8,200 | 3,600 |
| Synthesis Example 8 | Copolymer 8 | 6:1 | H | TEA | —$(CH_2)_6$— | —$(CH_2)_6$— | S | 8,800 | 2,900 |
| Synthesis Example 9 | Copolymer 9 | 1:1 | H | $Na^+$ | —$(CH_2)_6$— | —$(CH_2)_6$— | S | 9,200 | 3,500 |
| Synthesis Example 10 | Copolymer 10 | 10:1 | $CH_3$ | $Na^+$ | —$(CH_2)_{12}$— | —$(CH_2)_{12}$— | S | 9,600 | 3,800 |
| Synthesis Example 11 | Copolymer 11 | 1:1 | H | TEA | —$(CH_2)_6$— | —$(CH_2)_6$— | E | 18,000 | 9,800 |
| Synthesis Example 12 | Copolymer 12 | 3:1 | $CH_3$ | TEA | —$(CH_2)_6$— | —$(CH_2)_6$— | E | 15,000 | 9,200 |

TABLE 1-continued

| Synthesis Example No. | Copolymer No. | 1:2 (molar ratio) | R | X | L1 | L2 | Polymerization method | Mw | Mn |
|---|---|---|---|---|---|---|---|---|---|
| Comparative Synthesis Example 1 | Comparative Copolymer 1 | 1:1 | H | TEA | —(CH$_2$))$_6$— | —(CH$_2$))$_6$— | S | 7,000 | 2,400 |
| Comparative Synthesis Example 2 | Comparative Copolymer 2 | 3:1 | CH$_3$ | TEA | —(CH$_2$))$_6$— | —(CH$_2$))$_6$— | E | 14,000 | 9,000 |

Bond position of phenyl is the bond position of phenyl group to phenoxy group "S" and "E" in the polymerization method represent solution polymerization and emulsification polymerization, respectively.

Example 21

Preparation of Aqueous Ink 1

Preparation of Pigment Dispersion Element 1

16.0 parts of carbon black (NIPEX150, manufactured by Degussa AG) was added to 84.0 parts of the aqueous solution of copolymer 1 prepared in Synthesis Example 1 followed by stirring for 12 hours. The obtained mixture was subject to circulation dispersion at a peripheral speed of 10 m/s for one hour using a disk type bead mill (KDL type, media: zirconia ball having a diameter of 0.1 mm, manufactured by Shinmaru Enterprises Corporation) followed by filtration by a membrane filter having an opening diameter of 1.2 micro meter. Thereafter, deionized water was added for adjustment to obtain 95.0 parts of a pigment dispersion element 1 (pigment solid portion concentration: 16 percent).

Preparation of Ink 45.0 parts of pigment dispersion element 1, 10.0 parts of 1,3-butanediol, 10.0 parts of glycerin, 10.0 parts of 3-methoxy-N,N-diemthyl propionamide, 1.0 part of fluorine-containing surfactant (ZONYL™ FS-300, solid portion: 40 percent by weight, manufactured by E. I. du Pont de Nemours and Company), and 24.0 parts of deionized water were mixed followed by stirring for one hour and filtration by a membrane filter having an opening diameter of 1.2 micro meter to obtain an aqueous ink 1.

Example 22

Preparation of Aqueous Ink 2

Pigment dispersion element 2 was obtained in the same manner as in Example 21 except that the aqueous solution of copolymer 2 was used instead of the aqueous solution of copolymer 1 in the preparation of the pigment dispersion element of Example 21.

Thereafter, aqueous ink 2 was obtained in the same manner as in Example 21 except that the pigment dispersion element 2 was used instead of the pigment dispersion element 1 in the manufacturing of the ink of Example 21.

Example 23

Preparation of Aqueous Ink 3

A pigment dispersion element 3 was obtained in the same manner as in Example 22 except that Pigment Blue 15:3 (Chromofine Blue, manufactured by Dainichiseika Color & Chemicals Mfg. Co., Ltd.) was used instead of carbon black (NIPEX150, manufactured by Degussa AG) in the preparation of the pigment dispersion element of Example 22 and the solid portion concentration was changed to 20.0 percent.

Thereafter, 30.0 parts of pigment dispersion element 3, 15.0 parts of 1,3-butanediol, 10.0 parts of glycerin, 20.0 parts of 3-methoxy-N,N-diemthyl propionamide, 1.0 part of fluorine-containing surfactant (ZONYL™ FS-300, solid portion: 40 percent by weight, manufactured by E. I. du Pont de Nemours and Company), and 24.0 parts of deionized water were mixed followed by stirring for one hour and filtration by a membrane filter having an opening diameter of 1.2 micro meter to obtain an aqueous ink 3.

Example 24

Preparation of Aqueous Ink 4

A pigment dispersion element 4 was obtained in the same manner as in Example 22 except that Pigment Blue 122 (Toner magenta E002, manufactured by (Clariant Japan K.K.) was used instead of carbon black (NIPEX150, manufactured by Degussa AG) in the preparation of the pigment dispersion element of Example 22 and the solid portion concentration was changed to 20.0 percent.

Thereafter, aqueous ink 4 was obtained in the same manner as in Example 22 except that the pigment dispersion element 4 was used instead of the pigment dispersion element 2 in the manufacturing of the ink of Example 22.

Example 25

Preparation of Aqueous Ink 5

A pigment dispersion element 5 was obtained in the same manner as in Example 22 except that yellow pigment (Fast Yellow 531, manufactured by Dainichiseika Color & Chemicals Mfg. Co., Ltd.) was used instead of carbon black (NIPEX150, manufactured by Degussa AG) in the preparation of the pigment dispersion element of Example 22 and the solid portion concentration was changed to 20.0 percent.

Thereafter, aqueous ink 5 was obtained in the same manner as in Example 23 except that the pigment dispersion element 5 was used instead of the pigment dispersion element 3 in the manufacturing of the ink of Example 23.

Example 26

Preparation of Aqueous Ink 6

Pigment dispersion element 6 was obtained in the same manner as in Example 21 except that the aqueous solution of copolymer 3 was used instead of the aqueous solution of copolymer 1 in the preparation of the pigment dispersion element of Example 21.

Thereafter, aqueous ink 6 was obtained in the same manner as in Example 21 except that the pigment dispersion element 6 was used instead of the pigment dispersion element 1 in the manufacturing of the ink of Example 23.

Example 27

Preparation of Aqueous Ink 7

Pigment dispersion element 7 was obtained in the same manner as in Example 21 except that the aqueous solution of copolymer 4 was used instead of the aqueous solution of copolymer 1 in the preparation of the pigment dispersion element of Example 21.

Thereafter, aqueous ink 7 was obtained in the same manner as in Example 21 except that the pigment dispersion element 7 was used instead of the pigment dispersion element 1 in the manufacturing of the ink of Example 21.

Example 28

Preparation of Aqueous Ink 8

Pigment dispersion element 8 was obtained in the same manner as in Example 21 except that the aqueous solution of copolymer 5 was used instead of the aqueous solution of copolymer 1 in the preparation of the pigment dispersion element of Example 21.

Thereafter, aqueous ink 8 was obtained in the same manner as in Example 21 except that the pigment dispersion element 8 was used instead of the pigment dispersion element 1 in the manufacturing of the ink of Example 21.

Example 29

Preparation of Aqueous Ink 9

Pigment dispersion element 9 was obtained in the same manner as in Example 21 except that the aqueous solution of copolymer 6 was used instead of the aqueous solution of copolymer 1 in the preparation of the pigment dispersion element of Example 21.

Thereafter, aqueous ink 9 was obtained in the same manner as in Example 21 except that the pigment dispersion element 9 was used instead of the pigment dispersion element 1 in the manufacturing of the ink of Example 21.

Example 30

Preparation of Aqueous Ink 10

Pigment dispersion element 10 was obtained in the same manner as in Example 21 except that the aqueous solution of copolymer 7 was used instead of the aqueous solution of copolymer 1 in the preparation of the pigment dispersion element of Example 21.

Thereafter, aqueous ink 10 was obtained in the same manner as in Example 21 except that the pigment dispersion element 10 was used instead of the pigment dispersion element 1 in the manufacturing of the ink of Example 21.

Example 31

Preparation of Aqueous Ink 11

Pigment dispersion element 11 was obtained in the same manner as in Example 21 except that the aqueous solution of copolymer 8 was used instead of the aqueous solution of copolymer 1 in the preparation of the pigment dispersion element of Example 21. Thereafter, aqueous ink 11 was obtained in the same manner as in Example 21 except that the pigment dispersion element 11 was used instead of the pigment dispersion element 1 in the manufacturing of the ink of Example 21.

Example 32

Preparation of Aqueous Ink 12

Pigment dispersion element 12 was obtained in the same manner as in Example 21 except that the aqueous solution of copolymer 9 was used instead of the aqueous solution of copolymer 1 in the preparation of the pigment dispersion element of Example 21.

Thereafter, aqueous ink 12 was obtained in the same manner as in Example 21 except that the pigment dispersion element 12 was used instead of the pigment dispersion element 1 in the manufacturing of the ink of Example 21.

Example 33

Preparation of Aqueous Ink 13

Pigment dispersion element 13 was obtained in the same manner as in Example 21 except that the aqueous solution of copolymer 10 was used instead of the aqueous solution of copolymer 1 in the preparation of the pigment dispersion element of Example 21.

Thereafter, aqueous ink 13 was obtained in the same manner as in Example 21 except that the pigment dispersion element 13 was used instead of the pigment dispersion element 1 in the manufacturing of the ink of Example 21.

Example 34

Preparation of Aqueous Ink 14

The following recipe was mixed and stirred for 30 minutes to prepare an aqueous solution 1.

| | |
|---|---|
| 2-ethyl-1,3-hexane diol: | 2.00 parts |
| Glycerol: | 10.00 parts |
| 3-methoxy-N,N-dimethyl propaneamide: | 15.00 parts |
| 3-buthoxy-N,N-dimethyl propaneamide: | 15.00 parts |
| 2-(cyclohexylamono) ethane sulfonic acid: | 0.05 parts |
| 2,4,7,9-tetramethyl-4,7-decanediol: | 0.50 parts |
| Fluorine-containing surfactant: (ZONYL FS-300, manufactured by E. I. du Pont de Nemours and Company): | 0.25 parts |
| Diethanol amine: | 0.01 parts |
| Deionized water: | 12.93 parts |

Thereafter, 50 g of dried carbon black, 100 mL of deionized water, and 15.5 g (50 mmol) of the compound having the following Chemical formula 6 were mixed. The mixture was heated to 60 degrees C. while being stirred at 300 rpm. 50 mmol of 20 percent sodium nitrite aqueous solution was added in 15 minutes. Thereafter, the resultant was stirred at 60 degrees C. for three hours. The resultant was diluted with 75 mL of deionized water followed by filtration. Deionized water was added in such a manner that the solid portion concentration of the filtrate was 20.0 percent to obtain pigment dispersion element 14 of carbon black.

Chemical formula 6

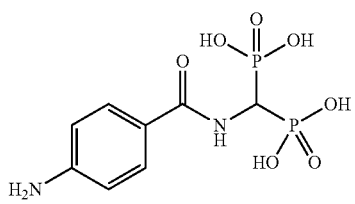

Thereafter, 37.50 parts of the pigment dispersion element 14 was added to the aqueous solution 1 followed by stirring for 30 minutes. Furthermore, 6.67 parts of the copolymer 11 (solid portion concentration: 30 percent) was added followed by stirring for 30 minutes. Thereafter, aqueous ink 14 was obtained by filtering the resultant with a membrane filter having an average hole diameter of 1.2 μm.

Example 35

Preparation of Aqueous Ink 15

The following recipe was mixed and stirred for 30 minutes to prepare an aqueous solution 2.

| | |
|---|---|
| 2-ethyl-1,3-hexane diol: | 2.00 parts |
| Glycerol: | 10.00 parts |
| 3-methoxy-N,N-dimethyl propaneamide: | 20.00 parts |
| 3-buthoxy-N,N-dimethyl propaneamide: | 20.00 parts |
| 2-(cyclohexylamono) ethane sulfonic acid: | 0.05 parts |
| 2,4,7,9-tetramethyl-4,7-decanediol: | 0.50 parts |
| Fluorine-containing surfactant: (ZONYL FS-300, manufactured by E. I. du Pont de Nemours and Company): | 0.25 parts |
| Diethanol amine: | 0.01 parts |
| Deionized water: | 17.93 parts |

Thereafter, 4.50 g of p-amino benzoate was added to 150 g of deionized water heated to 60 degrees C. followed by mixing at 8,000 rpm for 10 minutes. Immediately after a solution in which 1.80 g of sodium nitrite was dissolved in 15 g of deionized water was added to this mixture, 20 g of copper phthalocyanine pigment (PB15:4, manufactured by Sun Chemical Corporation) was added followed by mixing at 8,500 rpm for one hour.

Furthermore, a solution in which 4.5 g of p-amino benzoic acid was dissolved in 15 g of deionized water was added followed by mixing at 65 degrees C. at 8,500 rpm for three hours. The thus-obtained reaction mixture was filtered by a mesh of 200 nm. Subsequent to rinsing with water, the thus-obtained cyan pigment was dispersed in water. Coarse particles were removed by centrifugal and deionized water was added in such a manner that the solid portion concentration was 20.0% to obtain a cyan pigment dispersion element 15 having a surface treated with p-amino benzoic acid.

Thereafter, 22.50 parts of the cyan pigment dispersion element 15 was added to the aqueous solution 2 followed by stirring for 30 minutes. Furthermore, 6.67 parts of the copolymer 12 (solid portion concentration: 30 percent) was added followed by stirring for 30 minutes. Thereafter, aqueous ink 15 was obtained by filtering the resultant with a membrane filter having a hole diameter of 1.2 micro meter.

Example 36

Preparation of Aqueous Ink 16

The aqueous solution 1 was prepared in the same manner as in Example 34.

Thereafter, 4.50 g of sulphanilic acid was added to 150 g of deionized water heated to 60 degrees C. followed by mixing at 8,000 rpm for 10 minutes. Immediately after a solution in which 1.80 g of sodium nitrite was dissolved in 15 g of deionized water was added to this mixture, 20 g of magenta pigment (PR122, manufactured by Sun Chemical Corporation) was added followed by mixing at 8,500 rpm for one hour. Furthermore, a solution in which 4.5 g of sulphanilic acid was dissolved in 15 g of deionized water was added followed by mixing at 65 degrees C. at 8,500 rpm for three hours. The thus-obtained reaction mixture was filtered by a mesh of 200 nm. Subsequent to rinsing with water, the thus-obtained magenta pigment was dispersed in water. Coarse particles were removed by centrifugal and deionized water was added in such a manner that the solid portion concentration was 20.0% to obtain a magenta pigment dispersion element 16 having a surface treated with sulphanilic acid.

Thereafter, 37.50 parts of the pigment dispersion element 16 was added to the aqueous solution 1 followed by stirring for 30 minutes. Furthermore, 6.67 parts of the copolymer 12 (solid portion concentration: 30 percent) was added followed by stirring for 30 minutes. Thereafter, aqueous ink 16 was obtained by filtering the resultant with a membrane filter having an average hole diameter of 1.2 μm.

Example 37

Preparation of Aqueous Ink 17

The aqueous solution 2 was prepared in the same manner as in Example 35. 22.50 parts of the cyan pigment dispersion element 3 (solid portion concentration: 20.0 percent) prepared in Example 3 was added to the aqueous solution 2 followed by stirring for 30 minutes. Furthermore, 6.67 parts of the copolymer 12 (solid portion concentration: 30 percent) was added followed by stirring for 30 minutes. Thereafter, aqueous ink 17 was obtained by filtering the resultant with a membrane filter having an average hole diameter of 1.2 μm.

Comparative Example 21

Preparation of Comparative Aqueous Ink 1

Comparative pigment dispersion element 1 was obtained in the same manner as in Example 21 except that the comparative copolymer 1 was used instead of the copolymer 1 in the preparation of the pigment dispersion element of Example 21.

Thereafter, comparative aqueous ink 1 was obtained in the same manner as in Example 21 except that the pigment dispersion element 1 was used instead of the pigment dispersion element 1 in the manufacturing of the ink of Example 21.

Comparative Example 22

Preparation of Comparative Aqueous Ink 2

Comparative pigment dispersion element 2 was obtained in the same manner as in Example 23 except that the comparative copolymer 1 was used instead of the copolymer 2 in the preparation of the pigment dispersion element of Example 23.

Thereafter, comparative aqueous ink 2 was obtained in the same manner as in Example 23 except that the comparative pigment dispersion element 2 was used instead of the pigment dispersion element 3 in the manufacturing of the ink of Example 23.

Comparative Example 23

Preparation of Comparative Aqueous Ink 3

Comparative pigment dispersion element 3 was obtained in the same manner as in Example 24 except that the comparative copolymer 1 was used instead of the copolymer 2 in the preparation of the pigment dispersion element of Example 24.

Thereafter, comparative aqueous ink 3 was obtained in the same manner as in Example 24 except that the comparative pigment dispersion element 3 was used instead of the pigment dispersion element 4 in the manufacturing of the ink of Example 24.

Comparative Example 24

Preparation of Comparative Aqueous Ink 4

Comparative pigment dispersion element 4 was obtained in the same manner as in Example 25 except that the comparative copolymer 1 was used instead of the copolymer 2 in the preparation of the pigment dispersion element of Example 25.

Thereafter, comparative aqueous ink 4 was obtained in the same manner as in Example 25 except that the comparative pigment dispersion element 4 was used instead of the pigment dispersion element 5 in the manufacturing of the ink of Example 25.

Comparative Example 25

Preparation of Comparative Aqueous Ink 5

The aqueous solution 2 was prepared in the same manner as in Example 35. 22.50 parts of the cyan pigment dispersion element 15 (solid portion concentration: 20.0 percent) prepared in Example 35 was added to the aqueous solution 2 followed by stirring for 30 minutes. Furthermore, 6.67 parts of the comparative copolymer 2 (solid portion concentration: 30 percent) was added followed by stirring for 30 minutes. Thereafter, comparative aqueous ink 5 was obtained by filtering the resultant with a membrane filter having an average hole diameter of 1.2 µm.

Comparative Example 26

Preparation of Comparative Aqueous Ink 6

The aqueous solution 1 was prepared in the same manner as in Example 36. 37.50 parts of the magenta pigment dispersion element 16 (solid portion concentration: 20.0 percent) prepared in Example 36 was added to the aqueous solution 1 followed by stirring for 30 minutes. Furthermore, 6.67 parts of the comparative copolymer 2 (solid portion concentration: 30 percent) was added followed by stirring for 30 minutes. Thereafter, comparative aqueous ink 6 was obtained by filtering the resultant with a membrane filter having an average hole diameter of 1.2

Comparative Example 27

Preparation of Comparative Aqueous Ink 6

Thereafter, comparative aqueous ink 7 was obtained in the same manner as in Example 37 except that the comparative pigment dispersion element 2 was used instead of the cyan pigment dispersion element 3 in the manufacturing of the ink of Example 37 and the comparative copolymer 2 was used instead of the copolymer 12.

Characteristics of the inks prepared in Examples and Comparative examples were evaluated in the following manner.

The results are shown in Table 2.

Image Density

An inkjet printer (IPSiO GX5000) was filled with each ink at 23 degrees C. and 50 percent RH. A chart including general symbols of 64 point JIS.X.0208 (1997) and 2223 made by Microsoft Word 2000 (manufactured by Microsoft Corporation) was printed on plain paper 1 (Xerox 4200, manufactured by Xerox Corporation) and paper 2 (My Paper, manufactured by Ricoh Company Ltd. The symbol portion on image surface was measured by X-Rite 938 (manufactured by X-Rite Inc.) and evaluated according to the following criteria.

The printing mode used: A modified mode in which "Plain Paper-Standard Fast" was modified to "No Color Calibration" from the user setting for plain paper by the driver installed onto the printer.

Incidentally, the symbols of JIS X 0208 (1997) and 2223 have squares for the exterior and the inside thereof is entirely painted with ink.

Evaluation Criteria
  A: 1.25 or greater
  B: 1.20 to less than 1.25
  C: 1.10 to less than 1.20
  D: Less than 1.10
  E: pigment was gelated and not dispersed, impossible to print symbols.

Storage Stability of Ink

An ink cartridge was filled with each ink and stored at 70 degrees C. for one week. The change rate of the viscosity after the storage to the viscosity before the storage was obtained from the following relation and evaluated according to the following criteria.

Change rate (%) of viscosity=(Viscosity of ink after storage)/(Viscosity of ink before storage)

The viscosity was measured by a viscometer (RE80L, manufactured by TOKI SANGYO CO., LTD.) to measure the viscosity of the ink at 25 degrees C. at 50 rotations.

Evaluation Criteria
  A: Change rate of viscosity within + or −5%
  B: Change rate of viscosity within the range of from −8% to less than −5% and more than 5% to 8%
  C: Change rate of viscosity within the range of from less than −8% to −10% and more than 8% to 10%
  D: Change rate of viscosity within the range of from less than −10% to −30% and more than 10% to 30%
  E: Change rate of viscosity less than 30% or greater than 30% (gelated to the degree that evaluation was not possible)

Beading

The general symbols of JIS X 0208 (1997) and 2223 of were printed in the same manner as for Image Density except that the print mode was changed to the mode "gloss paper-fast" using LumiArt Gloss 90 GSM™ (manufactured by Stora Enso Japan K.K.) as the recording medium and the printed symbols were evaluated according to the following criteria.

Evaluation Criteria
  A: No beading or beading occurred to less than 10% of the entire image B: Beading occurred to 10% to less than 20% of the entire image C: Beading occurred to 20% to less than 40% of the entire image D: Beading occurred to 40% to less than 90% of the entire image E: Beading occurred to 90% or more of the entire image F: Gelated pigment not dispersed, impossible to print symbols In addition, if the copolymer of the present disclosure is used as a dispersion resin of a pigment, a stable dispersion element of a pigment having a high level of dispersibility is obtained.

In addition, high image density is achieved even on plain paper by an aqueous ink using the copolymer of the present disclosure. Moreover, the aqueous ink has excellent storage stability and does not cause beading even at high performance.

TABLE 2

| | Copolymer | | Coloring | Image density | | Storage | |
| | kind | Usage | material | Plain paper 1 | Plain paper 2 | stability | Beading |
|---|---|---|---|---|---|---|---|
| Example 21 | Copolymer 1 | Pigment dispersion | Carbon black | A | A | A | B |
| Example 22 | Copolymer 2 | Pigment dispersion | Carbon black | A | A | A | B |
| Example 23 | Copolymer 2 | Pigment dispersion | Cyan pigment | A | A | A | C |
| Example 24 | Copolymer 2 | Pigment dispersion | Magenta pigment | A | A | B | C |
| Example 25 | Copolymer 2 | Pigment dispersion | Yellow pigment | A | A | A | B |
| Example 26 | Copolymer 3 | Pigment dispersion | Carbon black | A | A | A | B |
| Example 27 | Copolymer 4 | Pigment dispersion | Carbon black | A | A | B | B |
| Example 28 | Copolymer 5 | Pigment dispersion | Carbon black | A | A | A | B |
| Example 29 | Copolymer 6 | Pigment dispersion | Carbon black | A | A | A | B |
| Example 30 | Copolymer 7 | Pigment dispersion | Carbon black | A | A | A | B |
| Example 31 | Copolymer 8 | Pigment dispersion | Carbon black | A | A | B | B |
| Example 32 | Copolymer 9 | Pigment dispersion | Carbon black | A | A | C | A |
| Example 33 | Copolymer 10 | Pigment dispersion | Carbon black | A | A | C | B |
| Example 34 | Copolymer 11 | Addition | Carbon black | A | A | A | A |
| Example 35 | Copolymer 12 | Addition | Cyan pigment | A | A | A | A |
| Example 36 | Copolymer 12 | Addition | Magenta pigment | A | A | C | A |
| Example 37 | Copolymer 2 and Copolymer 12 | Pigment dispersion and addition | Cyan pigment | A | A | A | A |
| Comparative Example 21 | Comparative copolymer 1 | Pigment dispersion | Carbon black | C | D | D | B |
| Comparative Example 22 | Comparative copolymer 1 | Pigment dispersion | Cyan pigment | D | D | D | D |
| Comparative Example 23 | Comparative copolymer 1 | Pigment dispersion | Magenta pigment | D | D | D | D |
| Comparative Example 24 | Comparative copolymer 1 | Pigment dispersion | Yellow pigment | D | D | D | D |
| Comparative Example 25 | Comparative copolymer 2 | Addition | Cyan pigment | C | C | C | C |
| Comparative Example 26 | Comparative copolymer 2 | Addition | Magenta pigment | C | C | E | C |
| Comparative Example 27 | Comparative copolymer 1 and Comparative copolymer 2 | Pigment dispersion and addition | Cyan pigment | E | E | E | F |

According to the present invention, when the copolymer of the present disclosure is used as a binder resin in an aqueous ink, images having a high resolution and clarity can be formed on various recording media even at high performance.

Having now fully described embodiments of the present invention, it will be apparent to one of ordinary skill in the art that many changes and modifications can be made thereto without departing from the spirit and scope of embodiments of the invention as set forth herein.

What is claimed is:

1. A copolymer comprising,
a structure unit represented by Chemical formula 1; and
a structure unit represented by Chemical formula 2,

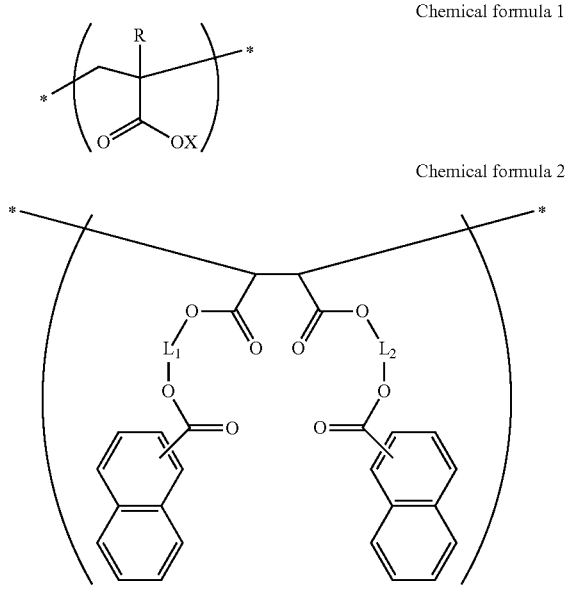

Chemical formula 1

Chemical formula 2 where R represents a hydrogen atom or a methyl group, X represents a hydrogen atom or a cation, L1 and L2 each, independently represent alkylene groups having 2 to 18 carbon atoms.

2. The copolymer according to claim 1, wherein a ratio of the structure unit represented by Chemical formula 1 to the structure unit represented by Chemical formula 2 ranges from 1:1 to 5:1.

3. The copolymer according to claim 1, wherein L1 and L2 in the structure unit represented by Chemical formula 2 each, independently represent alkylene groups having 2 to 12 carbon atoms.

4. An aqueous ink comprising:
water;
a coloring material; and
the copolymer of claim 1.

5. The aqueous ink according to claim 4, wherein the coloring material is a pigment.

6. The aqueous ink according to claim 4, further comprising at least one of one or more water soluble organic solvent or one or more surfactant.

7. An ink cartridge comprising:
a container to accommodate the aqueous ink of claim 4.

* * * * *